(12) United States Patent
Nicholson

(10) Patent No.: US 11,254,072 B2
(45) Date of Patent: Feb. 22, 2022

(54) FIBER TOW WRAP RESISTANT FIBER PLACEMENT HEAD

(71) Applicant: Fives Machining Systems, Inc., Fond du Lac, WI (US)

(72) Inventor: Christopher D. Nicholson, Cincinnati, OH (US)

(73) Assignee: FIVES MACHINING SYSTEMS, INC., Fond du Lac, WI (US)

( * ) Notice: Subject to any disclaimer, the term of this patent is extended or adjusted under 35 U.S.C. 154(b) by 0 days.

(21) Appl. No.: 17/122,235

(22) Filed: Dec. 15, 2020

(65) Prior Publication Data
US 2021/0187875 A1  Jun. 24, 2021

Related U.S. Application Data

(60) Provisional application No. 62/949,655, filed on Dec. 18, 2019.

(51) Int. Cl.
| | | |
|---|---|---|
| *B29C 70/38* | (2006.01) | |
| *B29C 70/54* | (2006.01) | |
| *B32B 38/00* | (2006.01) | |
| *B29C 31/04* | (2006.01) | |

(52) U.S. Cl.
CPC .......... *B29C 70/384* (2013.01); *B29C 70/543* (2013.01); *B29C 31/04* (2013.01); *B32B 38/0004* (2013.01)

(58) Field of Classification Search
CPC ..... B29C 70/384; B29C 70/543; B29C 70/38; B29C 31/04; B32B 38/0004
See application file for complete search history.

(56) References Cited

U.S. PATENT DOCUMENTS

| | | |
|---|---|---|
| 5,273,614 A | 12/1993 | Grimshaw et al. |
| 8,156,988 B2 * | 4/2012 | Martinez ............... B29C 70/388 156/517 |
| 2005/0023414 A1 | 2/2005 | Braun |
| 2008/0302483 A1 | 12/2008 | Vaniglia |
| 2010/0200168 A1 | 8/2010 | Oldani et al. |
| 2011/0315324 A1 | 12/2011 | Vaniglia |
| 2013/0142898 A1 | 6/2013 | Vaniglia |

FOREIGN PATENT DOCUMENTS

EP   2495093 B1   4/2015

OTHER PUBLICATIONS

International Search Report for International Application No. PCT/US2020/065047 dated Mar. 30, 2021 (3 pages).

* cited by examiner

*Primary Examiner* — Mark A Osele
*Assistant Examiner* — Christopher C Caillouet
(74) *Attorney, Agent, or Firm* — Reising Ethington P.C.

(57) ABSTRACT

A fiber placement head for applying a plurality of composite tape segments on a mold including one or more powered wheels that are configured to engage and move composite tape; and one or more elongated fingers that closely conform to or abut an outer surface of the powered wheel(s) such that a portion of the elongated finger(s) forms at least a portion of a lane path.

20 Claims, 16 Drawing Sheets

FIBER TOW WRAP RESISTANT FIBER PLACEMENT HEAD

CROSS-REFERENCE TO RELATED PATENT APPLICATIONS

This is a U.S. non-provisional patent application which claims the benefit of priority from U.S. Provisional patent application number 62/949,655 filed on Dec. 18, 2019, the entire contents of which are hereby incorporated by reference.

TECHNICAL FIELD

The present application relates to fiber placement machines and, more particularly, to a fiber placement head that prevents fiber placement tows wraps.

BACKGROUND

Fiber placement machines are used to create composite workpieces. Composite material, in the form of fibrous material impregnated with resin, is applied by the machines to a mold or mandrel at precise locations and lengths to collectively form a composite workpiece. The fiber placement machine moves a fiber placement head over the mold to precisely apply composite tape in the ultimate shape of the composite workpiece. As the fiber placement head moves, it leaves a plurality of composite tape segments, also referred to as a course, or tows, behind on the mold. While a plurality of composite tape strands can be simultaneously applied as part of the course, the fiber placement head can individually control each of the tows as part of applying the course. The automatic application of these composite tape segments to the mold involves the cooperation of a diverse collection of machinery that holds, moves, and ultimately cuts the composite tape. For example, a fiber placement head applying a sixteen-tow course of composite tape over a mold can include individual lanes for each tow and mechanisms that hold and cut the tape.

Each individual lane can receive and communicate composite tape to the mold. However, as the composite tape passes through the lanes on its way to the mold, the tape, particularly the ends, can move outside of the lanes thereby preventing the passage of the tape to the mold. Removing tape from unwanted places can involve disassembling at least a portion of a fiber placement machine to remove the tape from where it left the lane and then properly guide the tape through the lane. Disassembly and attention to the fiber placement machine can consume time thereby decreasing the efficiency of the machine.

SUMMARY

In one implementation, a fiber placement head for applying a plurality of composite tape segments on a mold including one or more powered wheels that are configured to engage and move composite tape; and one or more elongated fingers that closely conform to or abut an outer surface of the powered wheel(s) such that a portion of the elongated finger(s) is adjacent to or forms at least a portion of a lane path.

In another implementation, a fiber placement head for applying a plurality of composite tape segments on a mold includes a plurality of powered wheels that are configured to engage and move composite tape; a center block, positioned in between the powered wheels, having a first mounting surface and a second mounting surface; and a plurality of elongated fingers that closely conform to or abut an outer surface of the powered wheels and are attached to the center block at the first mounting surface and the second mounting surface.

In another implementation, a fiber placement head for applying a plurality of composite tape segments on a mold includes one or more powered wheels that are configured to engage and move composite tape; a center block, positioned in between the powered wheels, having at least one mounting surface; and a plurality of elongated fingers that closely conform to or abut an outer surface of the powered wheel(s) and are biased into engagement with an outer surface of the powered wheels.

DETAILED DESCRIPTION

A fiber placement machine can use a robotic arm carrying a fiber placement head having a modular cut, clamp, and restart (CCR) assembly. The CCR assembly includes a plurality of cutting lane modules, clamping lane modules, and restarting lane modules each of which can be removably coupled to the fiber placement head. Each lane module can be designed to process one or more strands of composite tape that pass through it. And any one or more of the modules can be removed from the fiber placement head without affecting the performance of the other lane modules that are still attached to the head. For example, a fiber placement head that applies sixteen lanes of fiber tape could include lane modules that individually control two lanes of fiber tape. In such an implementation, the CCR assembly can include twenty-four lane modules (eight cutting lane modules, eight clamping lane modules, and eight restarting lane modules each controlling two lanes of fiber). At least one of the lane modules can include one or more elongated arms that attach to the CCR assembly or the lane module(s) and extend within a lane into close proximity to a restart roller. In that sense, the CCR assembly can include a plurality of elongated arms that each correspond to a lane. An outer surface of the elongated arm can closely conform to or about the restart roller and a distal end of the arm can form a portion of the lane adjacent the roller. In some implementations, the elongated arm can include an elastic or biasing feature that biases the arm into close proximity or engagement with the restart roller.

Lane modules can be further modularized by including removable submodules. For example, the cutting lane module can include a cutting subassembly that is removably attached to the module. Composite tape that is used to create composite workpieces often is comprised of fibrous material which has been impregnated with a resin that later provides strength to the composite workpiece after the resin is activated with heat. One example of a composite is carbon fiber. This is often referred to as "pre-preg" composite. The resin included with the composite tape can be quite sticky and adhere to machinery the tape touches. As composite tape continues to pass through the cutting lane module, the resin carried by the tape is increasingly left behind and can interfere with cutting machinery in the subassembly. The removal and replacement of the cutting subassembly from the cutting lane module can increase the speed and frequency with which the cutting machinery can be serviced. The cutting subassembly includes a cutting blade and one or more lane paths through which the composite tape passes that can be formed in a blade shoe and/or base against which the cutting blade can be reciprocally moved to selectively cut the composite tape. A connecting feature can engage or disengage the cutting subassembly from the cutting lane module for removal and reattachment after service.

Figure 1:
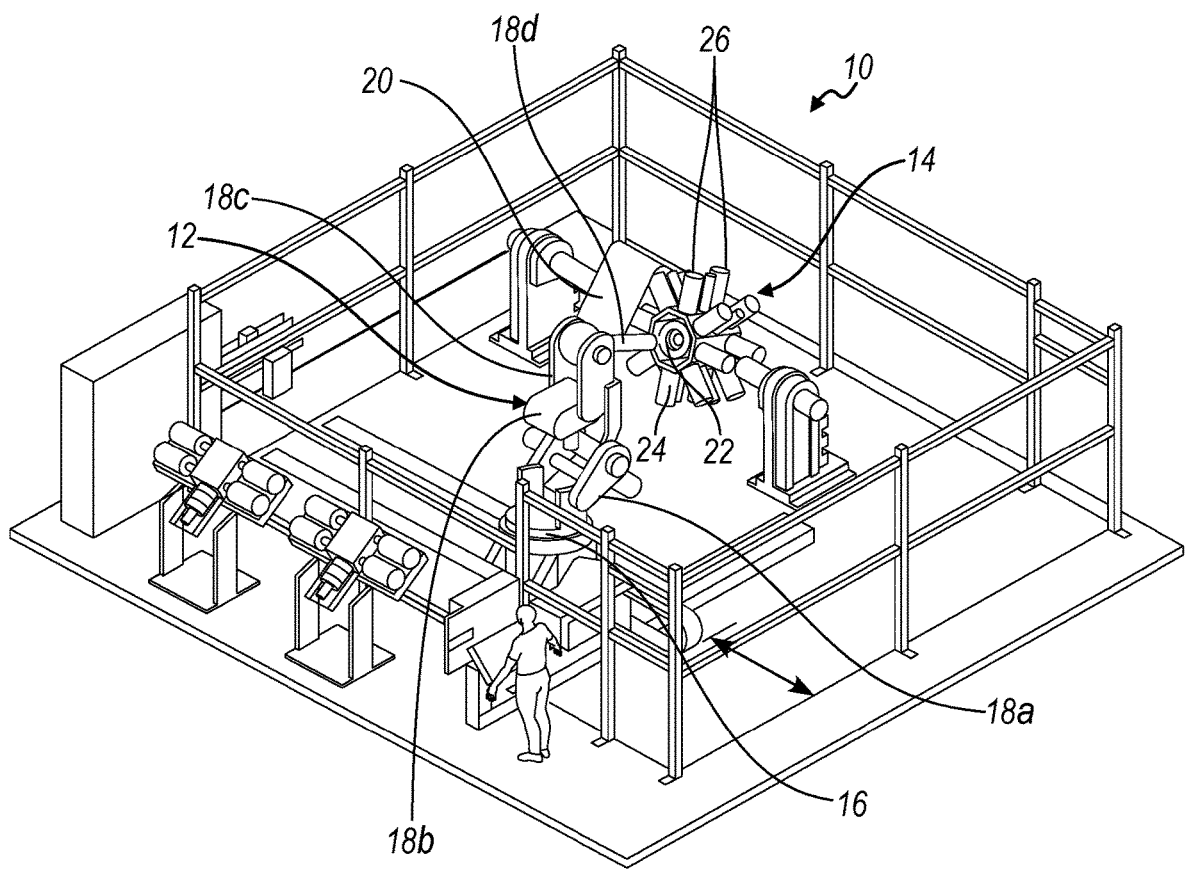
FIG. 1 is a perspective view depicting an implementation of a fiber placement machine.

An implementation of a fiber placement machine 10 is shown in FIG. 1. The fiber placement machine 10 includes a robotic arm 12 that is detachably coupled with a fiber placement head 14. The robotic arm can be supported by a base 16 upon which it moves linearly about an axis (x). A plurality of moveable segments 18, that can move by pivoting, rotating, or telescoping for example, may extend outwardly from the base 16. The robotic arm 12 can move relative to the base 16 about multiple axes. For example, a first segment 18a can rotatably couple to the base 16 at one end such that the robotic arm 12 can rotate about the base 16. A second segment 18b can pivotably couple with the first segment 18a and a third segment 18c can pivotably couple with the second segment. A fourth segment 18d can be coupled to the third segment 18c and telescopically move away from and toward the third segment. The segments 18 can be moved relative to each other using fluidic rams, electric motors, or some combination of these or other drive elements to move a distal end of the robotic 12 arm relative to a mold 20 or mandrel used to create a workpiece.

A microprocessor (not shown) in communication with a computer readable storage medium having executable instructions can control movement of the fluidic rams, electric motors, or other drive element thereby controlling the motion and position of the moveable segments 18 of the robotic arm 12. The microprocessor can be any type of device capable of processing electronic instructions including microcontrollers, host processors, controllers, and application specific integrated circuits (ASICs). It can be a dedicated processor used only to carry out control of the robotic arm 12 or can be shared with other machine functions. The microprocessor executes various types of digitally-stored instructions, such as software or firmware programs stored in memory. Communications between the mechanism that moves the robotic arm, such as the fluidic rams or electric motors, and the microprocessor can be carried out over a communications bus.

The robotic arm 12 can move the fiber placement head 14 along three axes to position the head 14 for service or to apply composite tape to the mold 20. While this is one implementation of a robotic arm 12 that can be used with a fiber placement head, other implementation of robotic arms or mechanical devices that apply composite tape can be used as well.

The end of the robotic arm 12 distal to the base 16 can include a chuck 22 that releasably engages the fiber placement head 14. The chuck 22 and a portion of the fiber placement head 14 can have corresponding features such that the chuck 22 can releasably grab the fiber placement head 14. In one implementation, the fiber placement head 14 includes a cylindrical shank extending orthogonal to a surface of the head 14. The robotic arm 12 can position the chuck 22 so that it engages the shank and the fiber placement head 14 is resiliently coupled to the arm 12.

Figure 2:
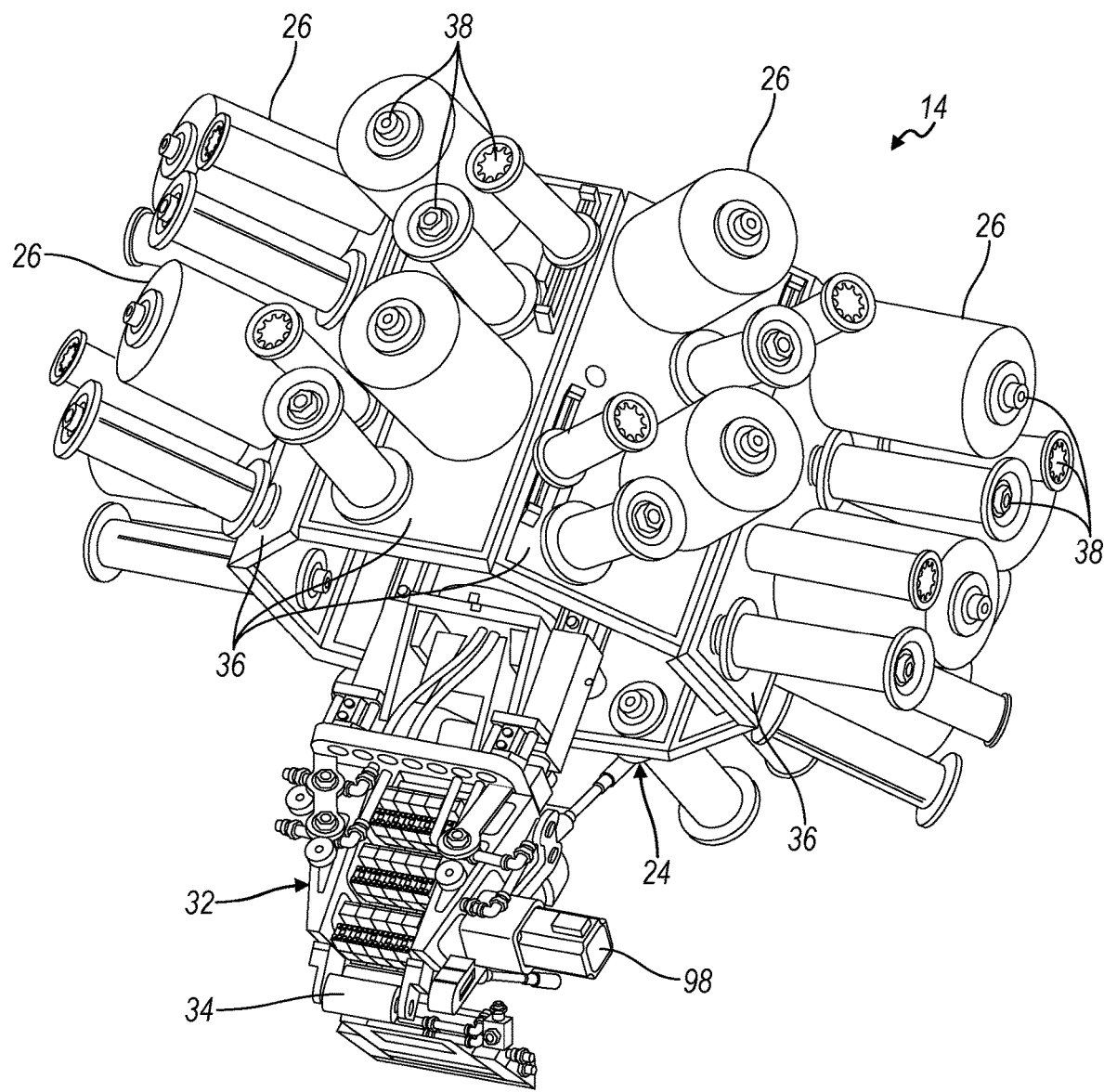
FIG. 2 is another perspective view depicting an implementation of a fiber placement head.
Figure 3:
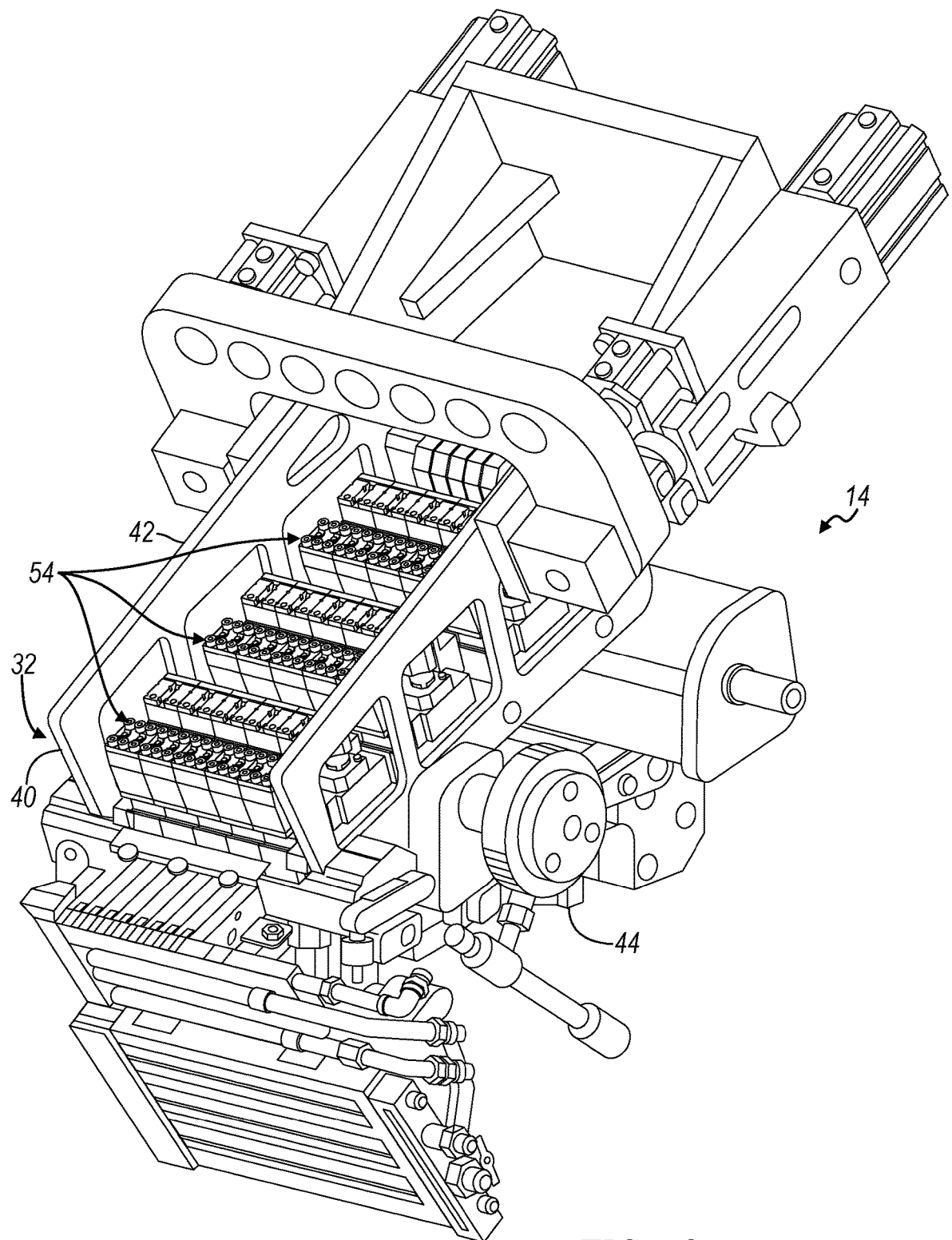
FIG. 3 is a perspective view depicting an implementation of a portion of a fiber placement head.
Figure 4:
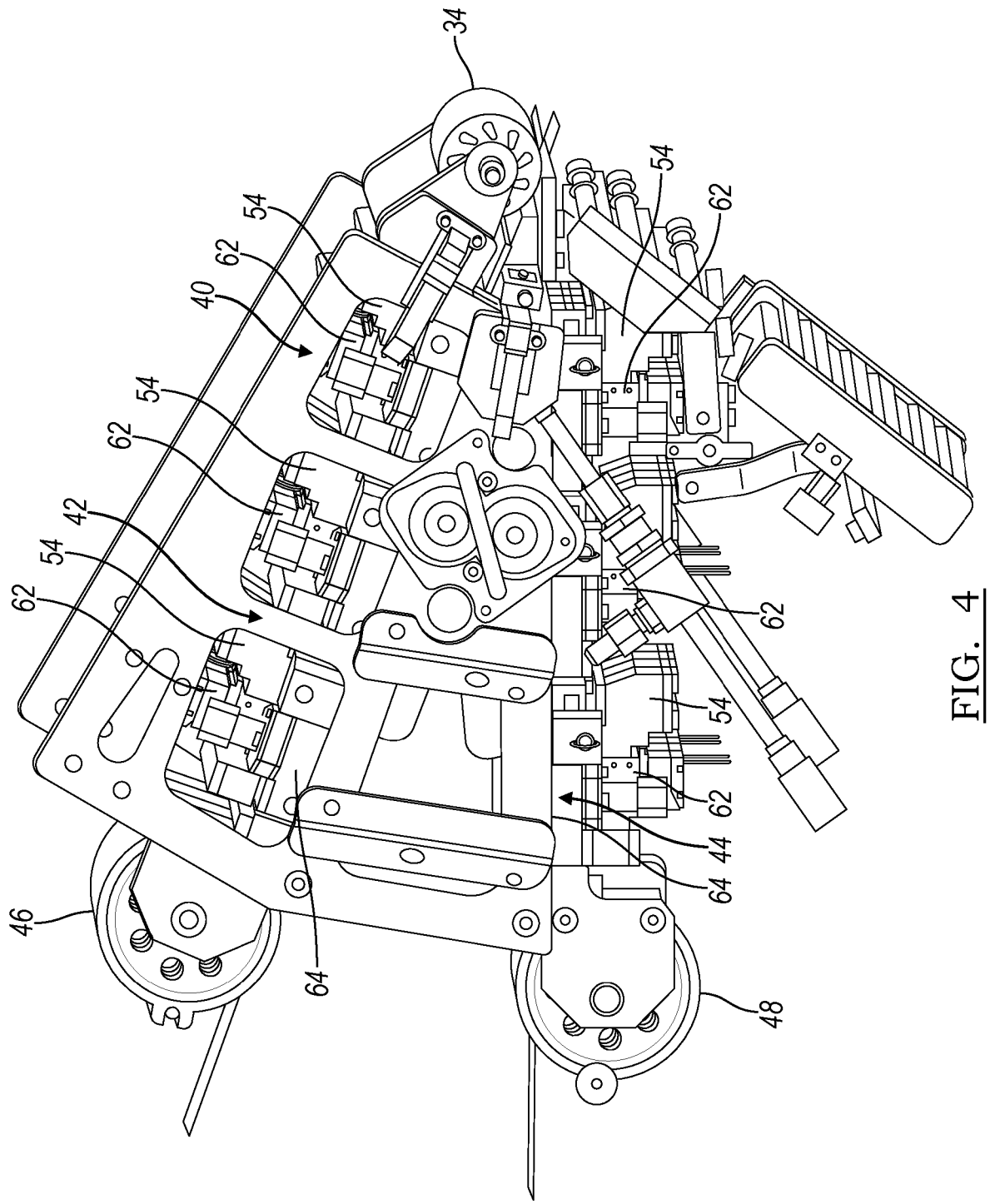
FIG. 4 is another perspective view depicting an implementation of a portion of a fiber placement head.
Figure 5:
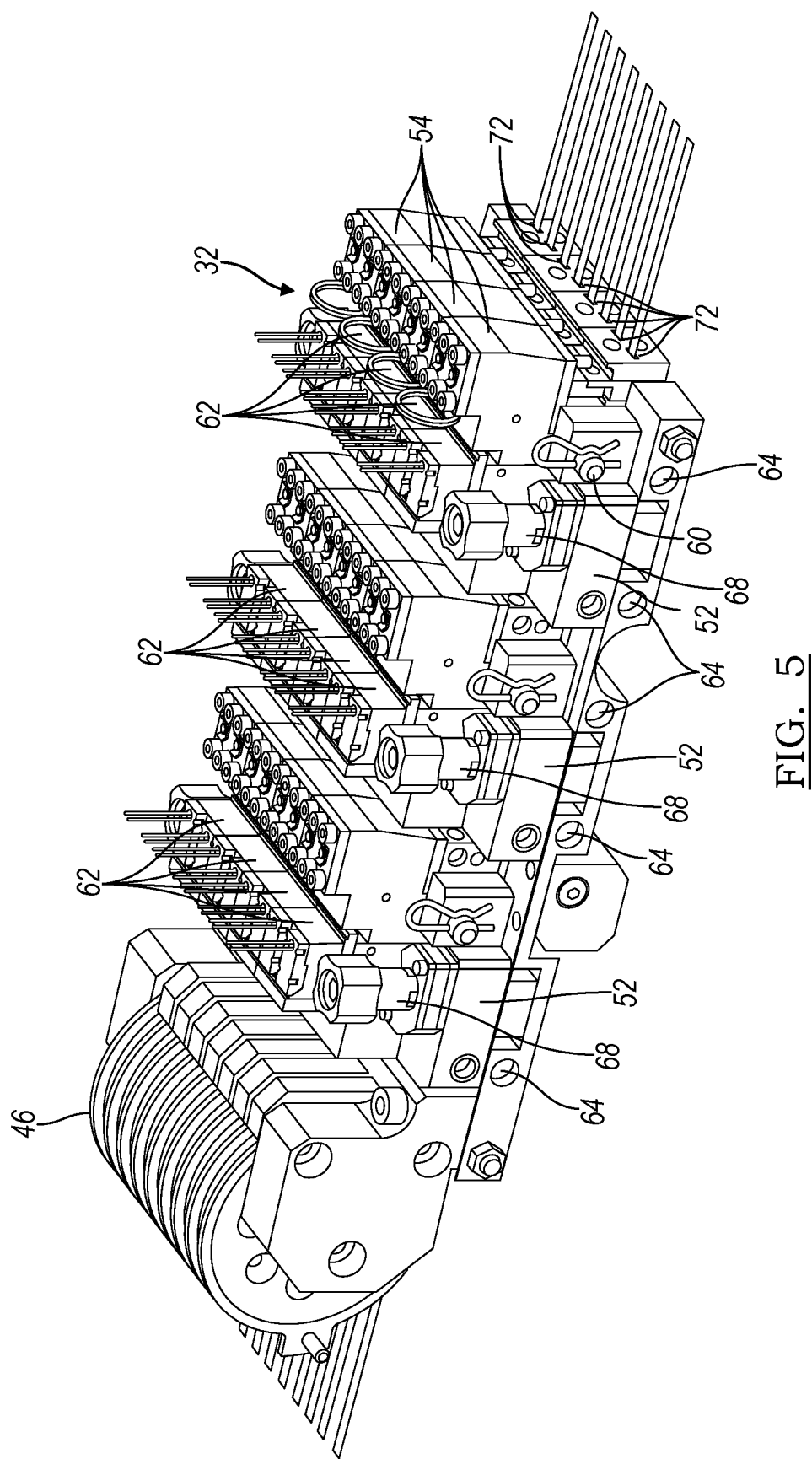
FIG. 5 is another perspective view depicting an implementation of a portion of a fiber placement head.
Figure 6:
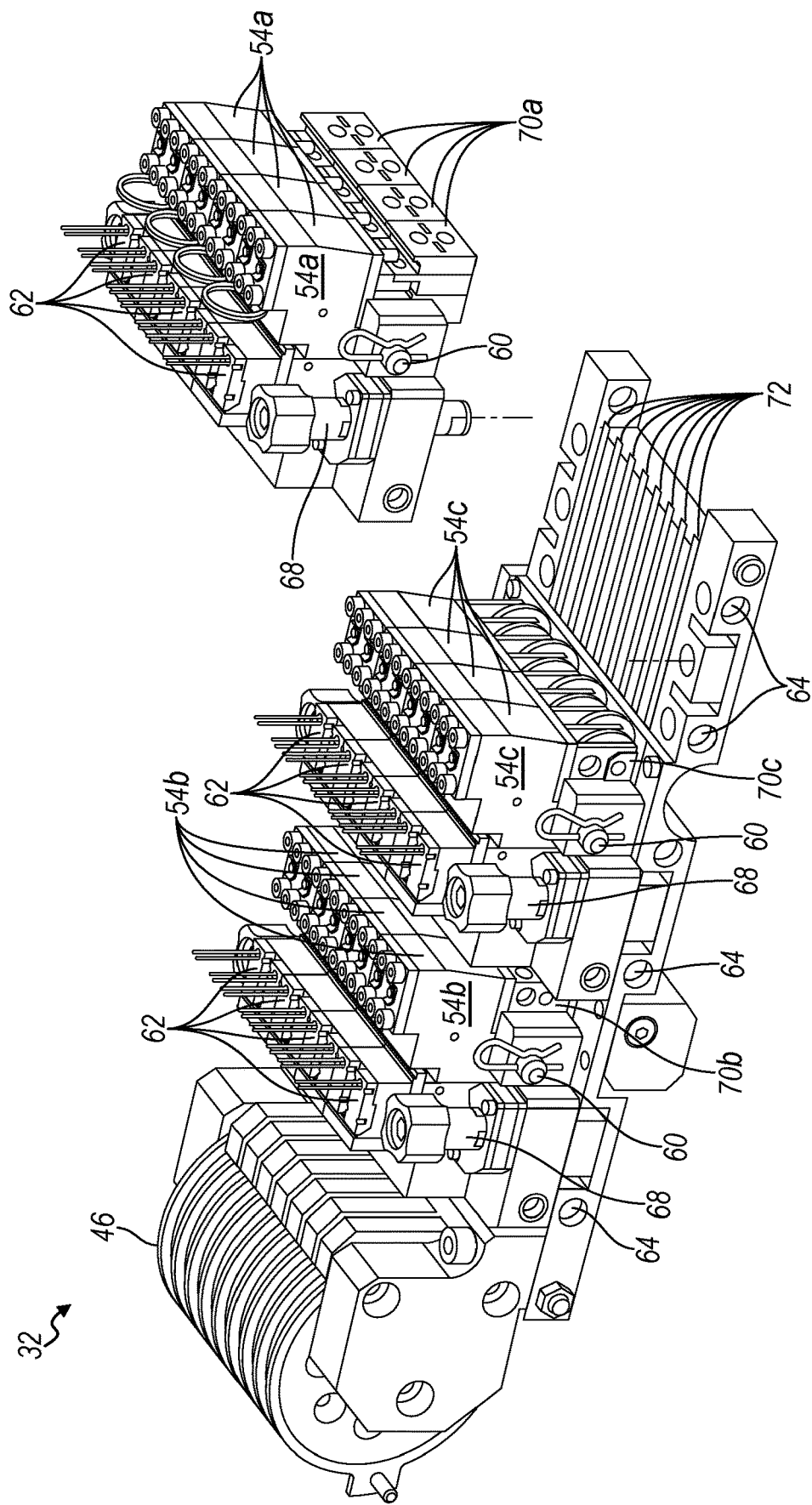
FIG. 6 is another perspective view depicting an implementation of a portion of a fiber placement head.
Figure 7:
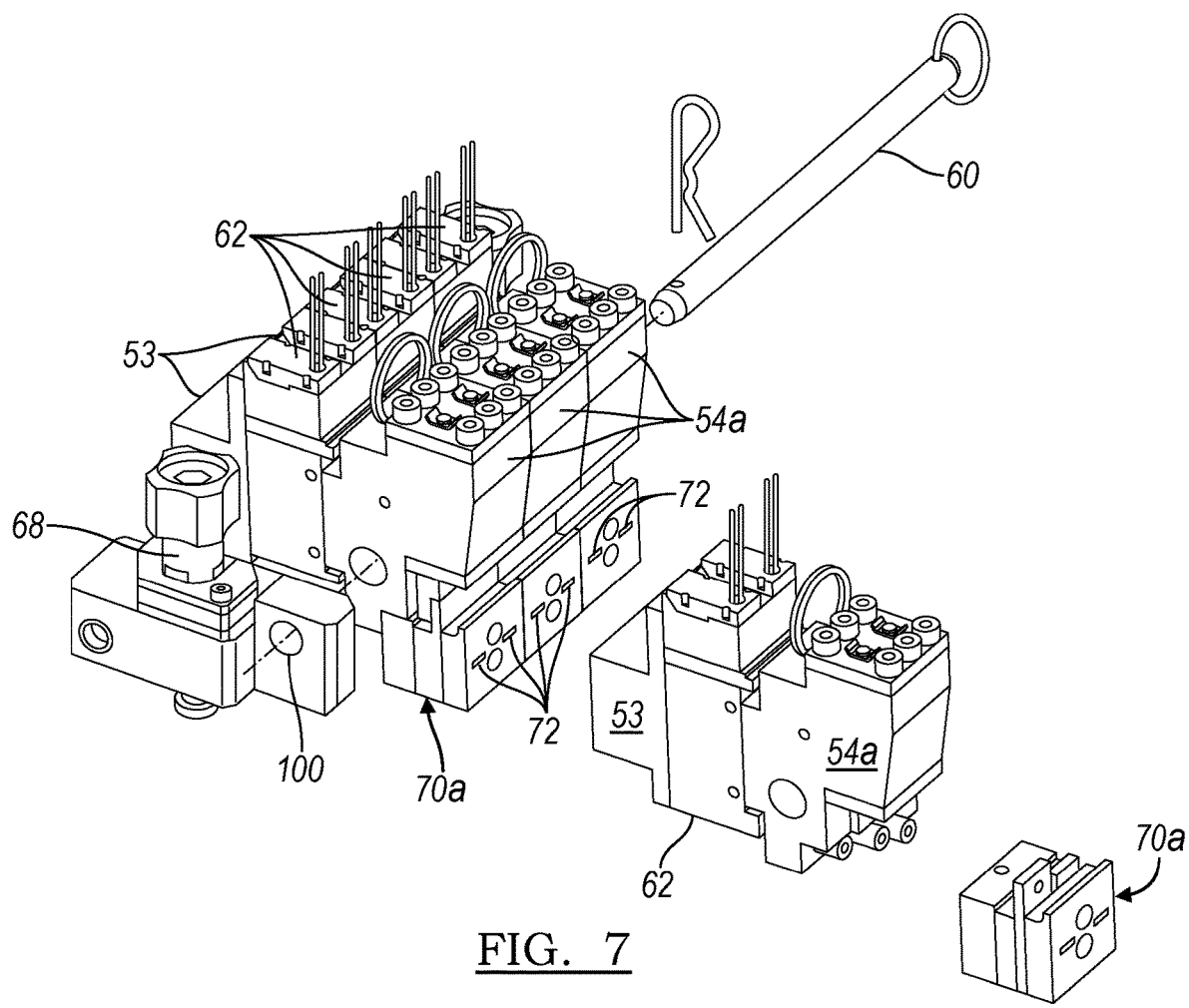
FIG. 7 is another perspective view depicting an implementation of a portion of a fiber placement head.
Figure 8:
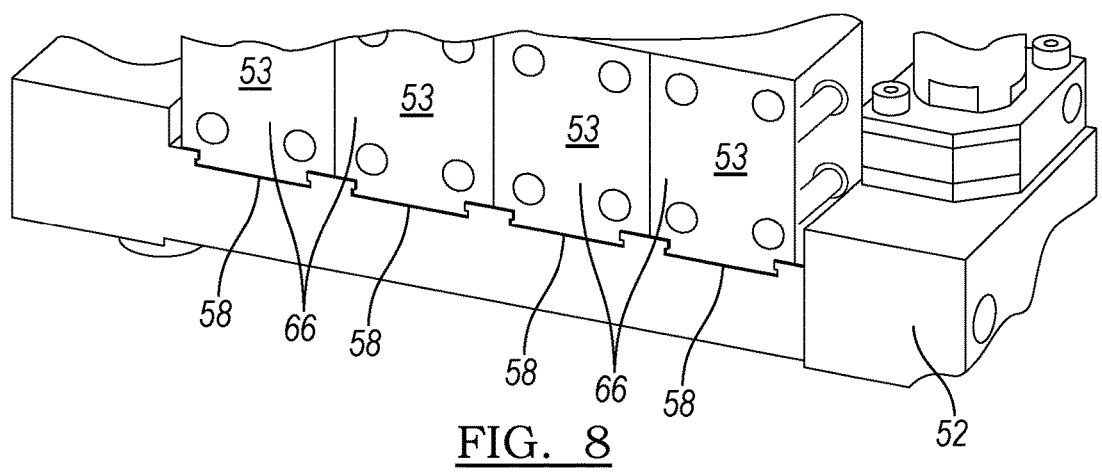
FIG. 8 is another perspective view depicting an implementation of a portion of a fiber placement head.
Figure 9:
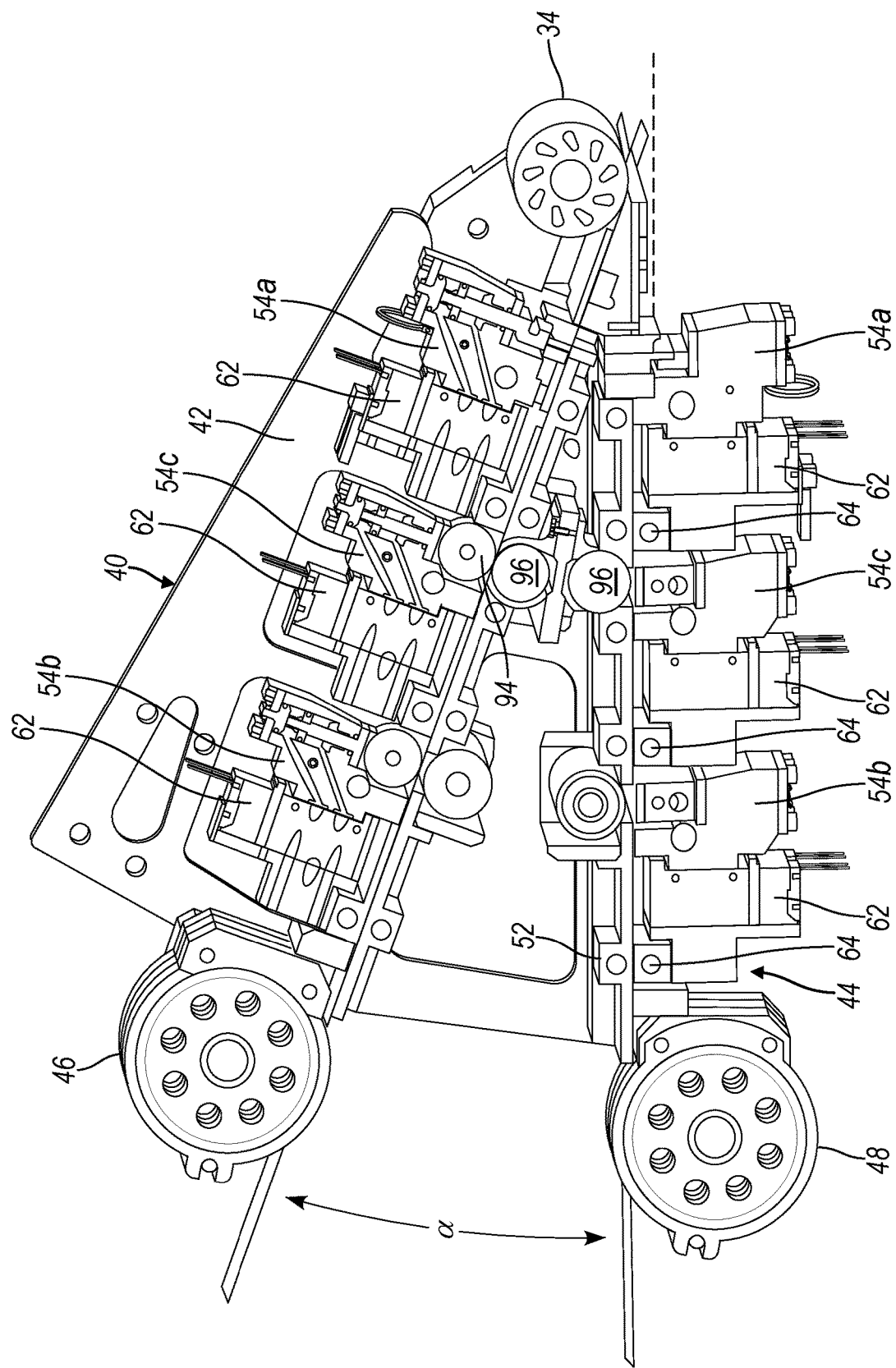
FIG. 9 is a cross-sectional view depicting an implementation of a portion of a fiber placement head.
Figure 10:
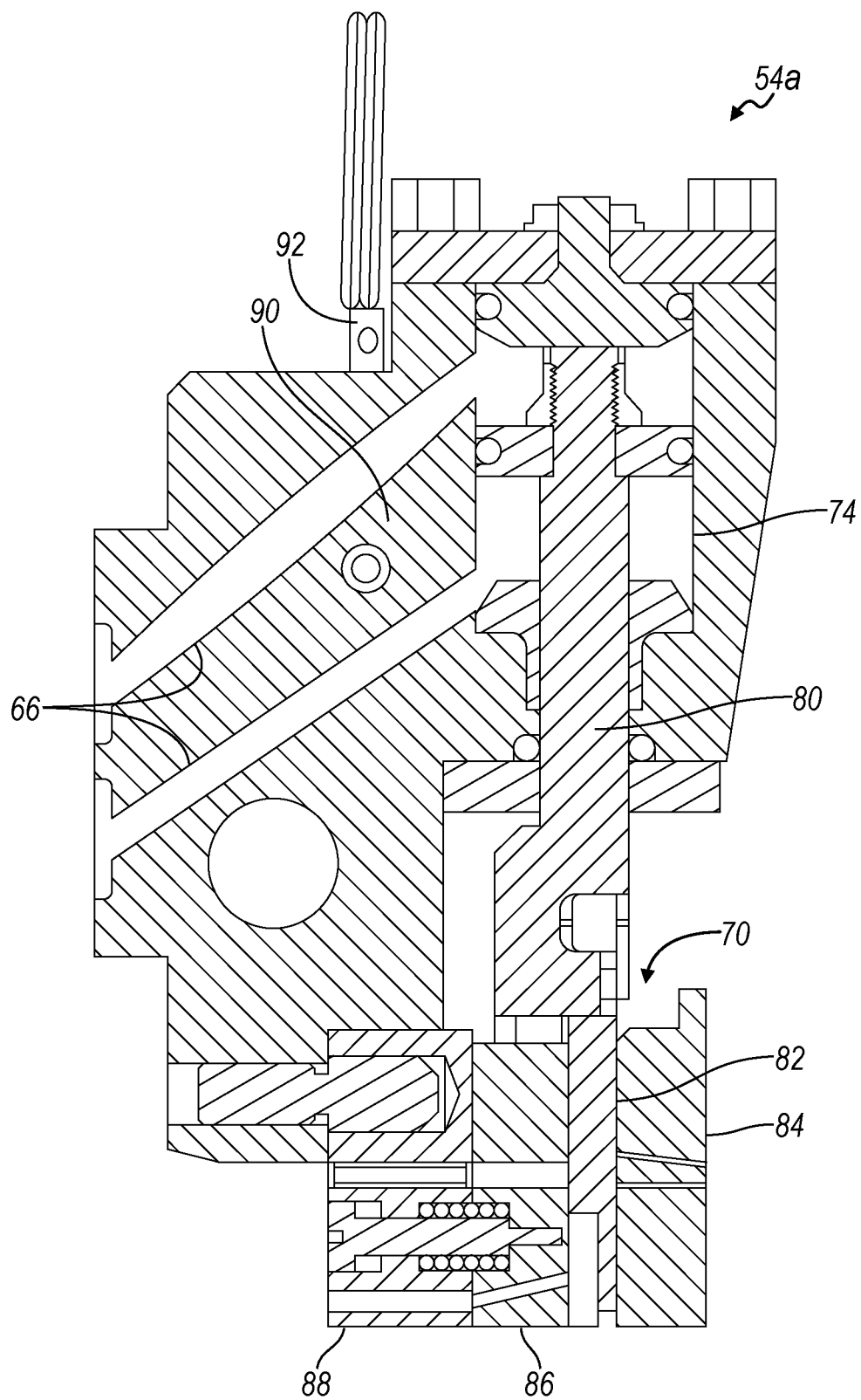
FIG. 10 is a cross-sectional view depicting an implementation of a portion of a fiber placement head.
Figure 11:
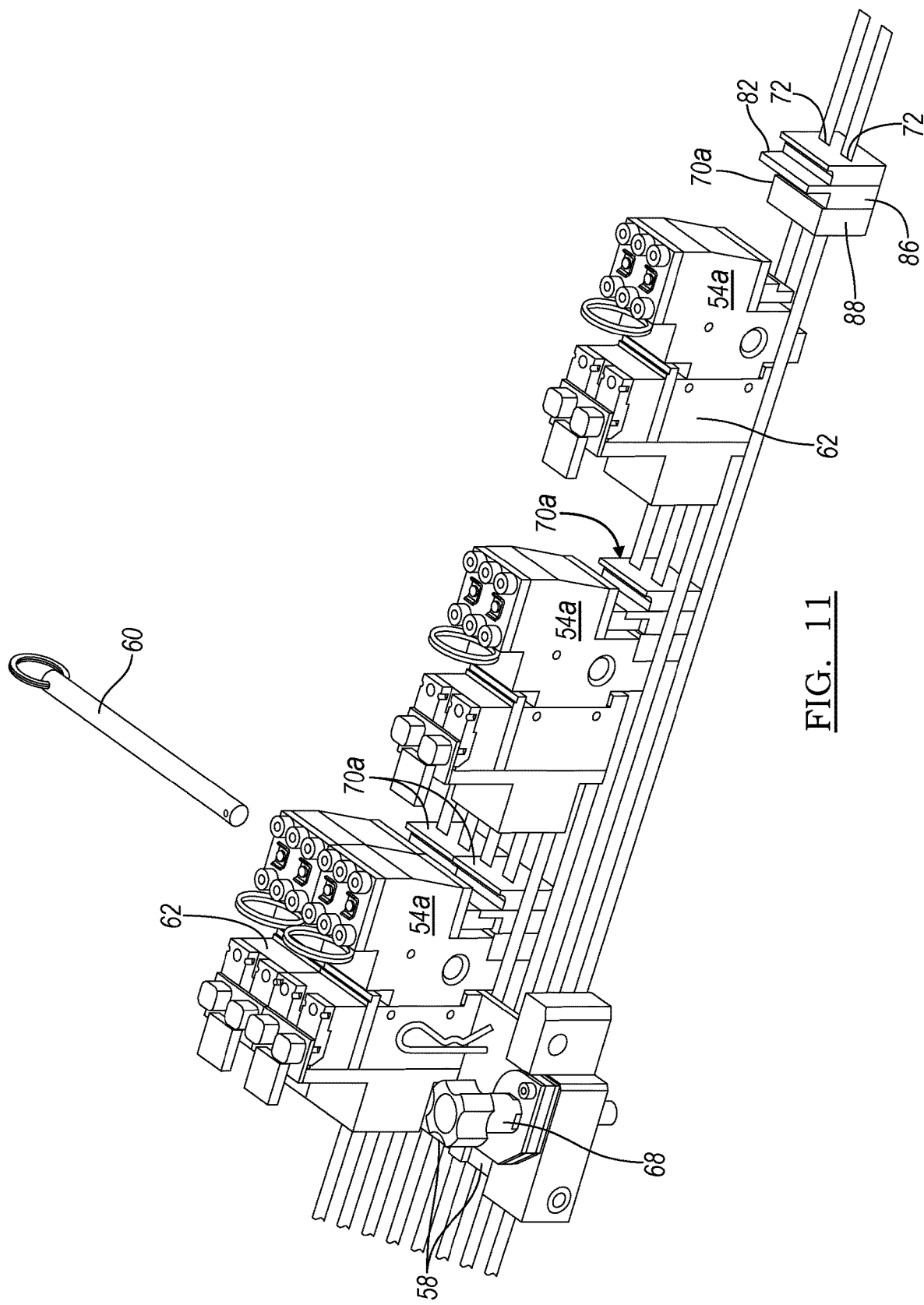
FIG. 11 is another perspective view depicting an implementation of a portion of a fiber placement head.
Figure 12:
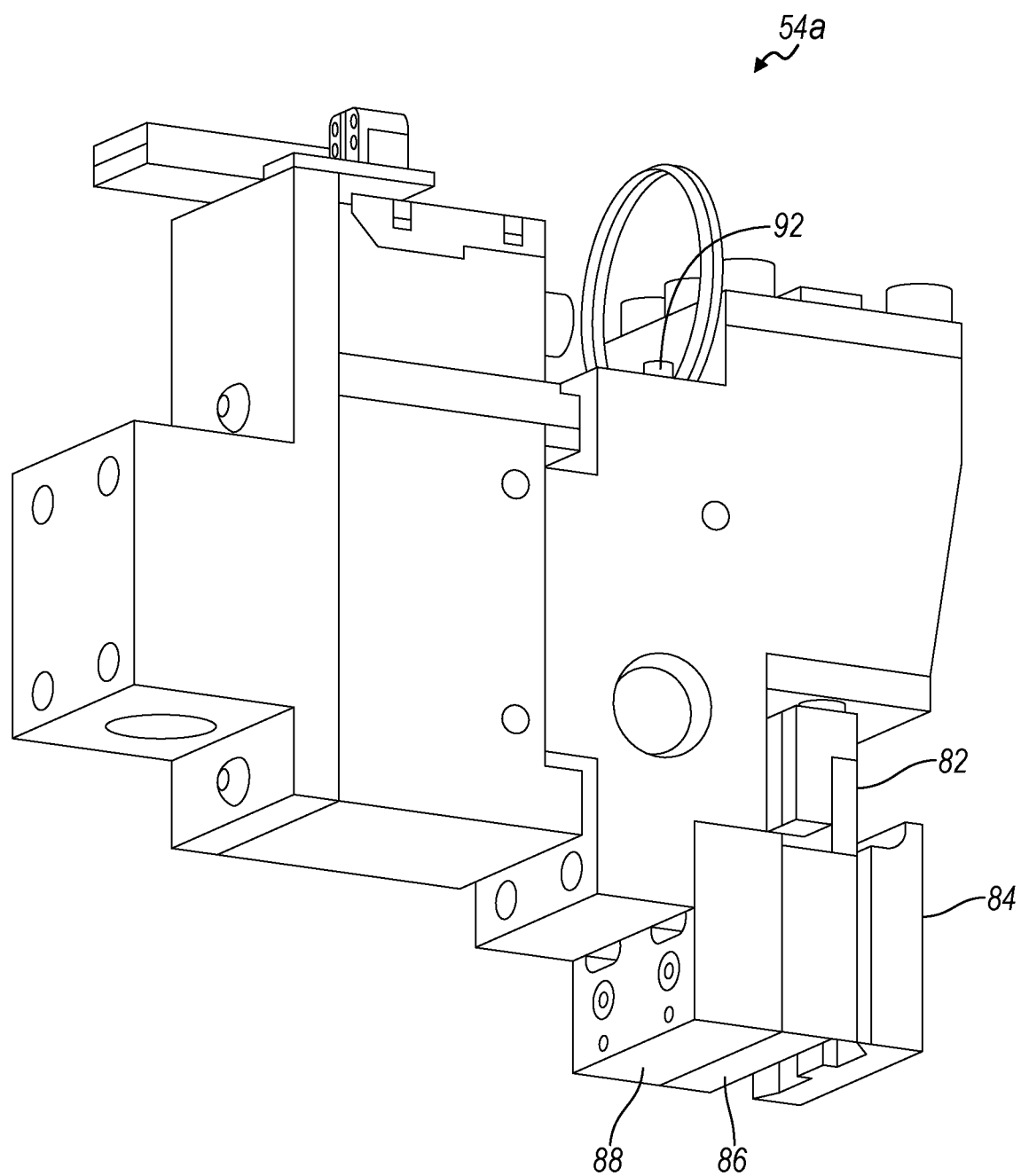
FIG. 12 is another perspective view depicting an implementation of a portion of a fiber placement head.
Figure 13:
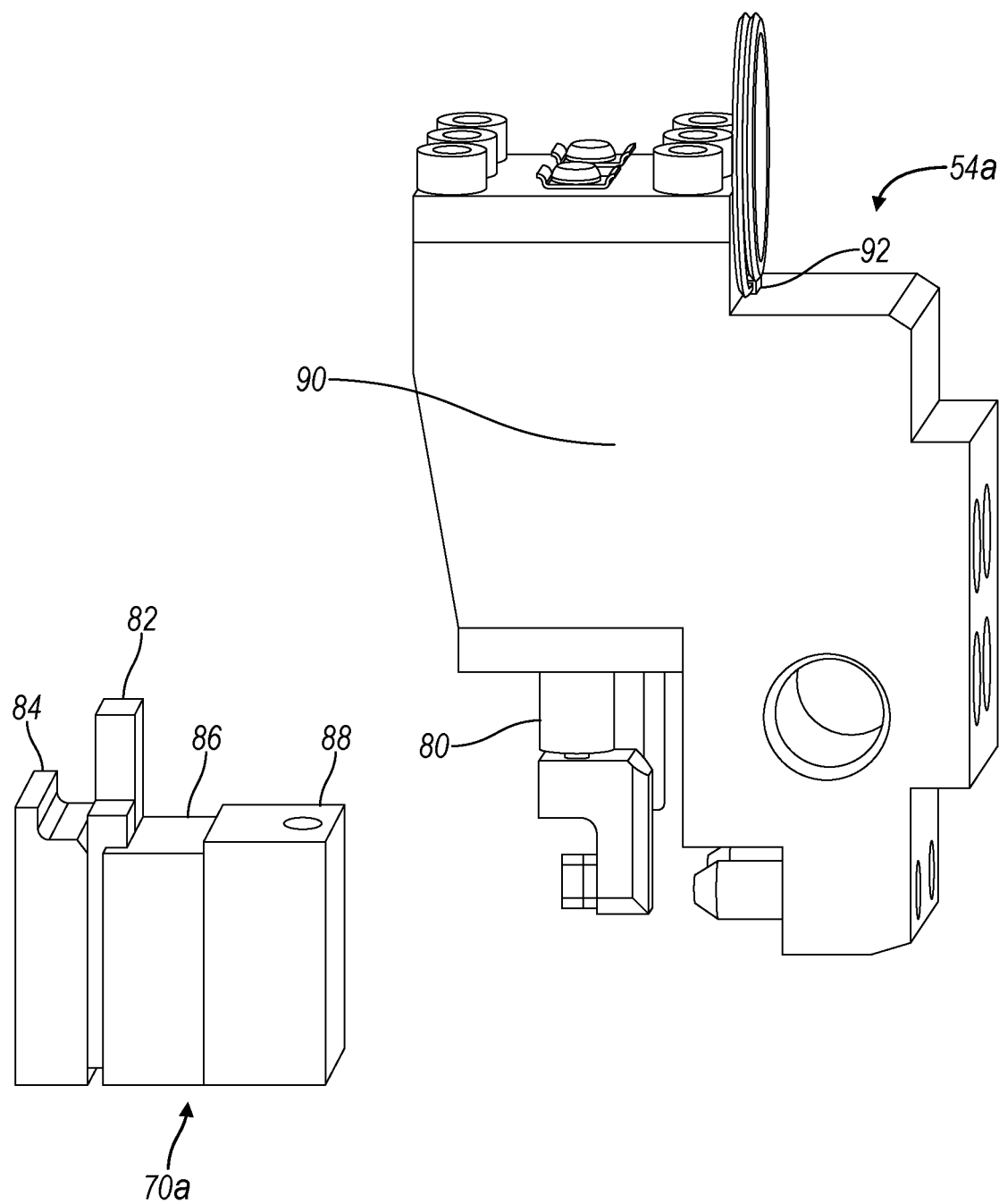
FIG. 13 is another perspective view depicting an implementation of a portion of a fiber placement head.

As shown in FIGS. 2-4, the fiber placement head 14 can include a creel frame 24, a plurality of spools 26 that carry composite tape as a source of this tape for the head 14, and a cut, clamp, restart (CCR) assembly 32 (shown in more detail in FIGS. 5-9). The CCR assembly 32 can include a compaction roller 34 (or alternatively a compaction slide) that can receive the composite tape from the spools 26 and apply it to the mold 20 to create a composite part. The creel frame 24 includes a plurality of outer surfaces 36 and spindles 38 mounted orthogonally relative to the outer surfaces 36. The spindles 38 can be moved to create tape tension using dancer elements controlled pneumatically, mechanically, or fluidically that help maintain tension on the composite tape as the tape is applied to the mold 20. The composite tape can unwind from the spools 26 and travel into the compaction roller 34 for ultimate application to the mold 20.

The fiber placement head 14 can include a CCR frame 40 for supporting the components of the fiber placement head 14, the CCR assembly 32, and the compaction roller 34 that ultimately presses the course of composite tapes onto the mold 20. Before arriving at the compaction roller 34, a portion of the composite tapes can pass through an upper feed portion 42 and another portion of the composite tapes can pass through a lower feed portion 44. The upper feed portion 42 can process even numbered composite tape and the lower feed portion 44 can process odd numbered composite tape that meet at the compaction roller 34. For instance, for a fiber placement head 14 having eight fiber pathways or lanes, the upper feed portion 42 can process composite tape identified by numbers 2, 4, 6, and 8 while the lower feed portion 44 can process composite tape identified by numbers 1, 3, 5, and 7. The upper feed portion 42 and the lower feed portion 44 can be separated by an angle ($\alpha$). An upper feed roller 46 and lower feed roller 48 can communicate composite tape from spools 26 to the upper feed portion 42 and lower feed portion 44, respectively. A plurality of lane modules 54 can be included with the upper feed portion 42 and the lower feed portion 44.

Each of the upper feed portion 42 and the lower feed portion 44 can include a manifold 64 for receiving a plurality of mounting bases 52 that can releasably receive a plurality of the lane modules 54. The mounting base 52 can include valve attachment features 68 that locate the base 52 relative to the manifold 64 and releaseably couple a plurality of lane modules 54 relative to the fiber placement head 14. The valve attachment feature 68, such as a ball lock that locates the fluid passageways 66 from the mounting base 52 to the manifold 64, and helps form a fluid-tight seal between the rear air block 53 and the base 52. The base 52 includes a plurality of attachment sites 58 (FIG. 7b) where the lane modules 54 ultimately couple to the base 52. The base 52 can be a discrete element that couples to the manifold 64 in which a plurality of electromagnetic valves 62 and lane modules 54 can be removed or installed simultaneously. In one implementation, the attachment site 58 can be a female dovetail that receives a corresponding male dovetail included with an element of the lane module 54 or a rear air block 53. The lane modules 54 can slide relative to the mounting base 52 via the dovetail connection during installation or removal of the modules 54 with respect to the fiber placement head 14. However, a plurality of lane modules 54 can ultimately be fixed to the mounting base 52 with a cross pin 60 that passes transverse to the direction in which the module 54 slides with respect to the dovetail and engages a portion of the mounting base 52 to prevent the movement of the lane modules 54 relative to the mounting base 52.

Electromechanical valves 62 abut the lane modules 54 and can be coupled to the mounting base 52 via a rear air block 53. Each lane module 54 can abut an electromagnetic valve 62 such that the valve 62 selectively supplies compressed air to the module 54 for actuation. The mounting base 52 can couple with the manifold 64 and fluid passageways 66 communicate compressed air from a source (not shown) through the rear air block 53 and the electromechanical valves 62 ultimately arriving at the lane modules 54 coupled to the base 52. An assembly of a rear air block 53, an electromagnetic valve 62, and a lane module 54 can be removably secured to the mounting base 52 using the cross pin 60. Compressed air can be selectively supplied to a lane module 54 by the electromagnetic valve 62 thereby communicating the air from the manifold 64 and the rear air block 53. In one implementation, the electromagnetic valve 62 includes a solenoid receiving a voltage that is controlled by a switch the microprocessor opens and closes to control actuation of the lane module 54.

Turning to FIGS. 10-13, lane modules 54 can each include a subassembly 70 that carries out a function of the fiber placement head 14 and one or more lane paths 72 through which composite tape passes. A pneumatic cylinder 74 for each subassembly 70 can control the function of the fiber placement head 14. An element of the subassembly 70 can be coupled with the pneumatic cylinder 74 and flow of compressed air into the pneumatic cylinder 74 from the manifold 64 can have an effect on the composite tape passing through the lane paths. In one embodiment, fluid passages 66 can communicate compressed air from an electromechanical valve 62 to a pneumatic piston assembly 80 that includes a piston. The pneumatic piston assembly 80 can slide relative to the cylinder 74 thereby performing some action on the composite tape depending on the subassembly 70 attached to the lane module 54.

Cutting lane modules 54a can include cutting subassemblies 70a. The cutting subassembly 70a can be removably attached to the cutting lane module 54a and include a cutting blade 82, an anvil plate 84, a blade shoe 86, and a base 88. The cutting subassembly 70a can include a portion of a lane path 72 through which the composite tape passes. For example, the cutting blade 82 can be biased against the anvil plate 84 by the blade shoe 86 to create a scissoring cut as the pneumatic piston assembly 80 moves relative to the pneumatic cylinder 74 and cuts the composite tape as the composite tape passes through the lane path 72 of the cutting subassembly 70a. The blade shoe 86 in this implementation can be biased by a spring to assist the scissoring. However, in other implementations, the anvil plate can be unbiased by a spring and the cutting blade may be separated from the anvil plate by a small clearance. The cutting blade 82 and the anvil plate 84 when positioned relative to each other in a first position can permit the composite tape to pass through a lane path 72 and when the cutting blade 82 is moved relative to the anvil plate 84, the tape can be cut. When in the first position, openings in the cutting blade 82 and openings in the anvil plate 84 and base 88 can at least partially define the lane paths 72. A fastener 92, such as an elongated member, pin, dowel, or threaded screw, can extend through an aperture 90 in the cutting lane module 54a and engage with the cutting subassembly 70a to secure it to the cutting lane module 54a. The fastener 92 can be removed from the cutting lane module 54a and the cutting subassembly 70a to release the subassembly 70a from the cutting lane module 54a for service or replacement. In this implementation, the fiber placement head 14 includes eight cutting lane modules 54a—four cutting lane modules 54a on the upper feed portion 42 and four cutting lane modules 54a on the lower feed portion 44. However, other implementations with greater or fewer cutting lane modules 54a are possible. Other lane modules 54 include clamping lane modules 54b and restarting lane modules 54c. The clamping lane modules 54b and restarting lane modules 54c can include a plurality of lane paths 72 and include a pneumatic piston 80 for each lane path 72 that can be selectively actuated so that it slides to hold composite tape in place. A clamping subassembly 70b and a restarting subassembly 70c can each include a guide wheel 94 for holding composite tape while it is applied on the mold 20.

Figure 14:
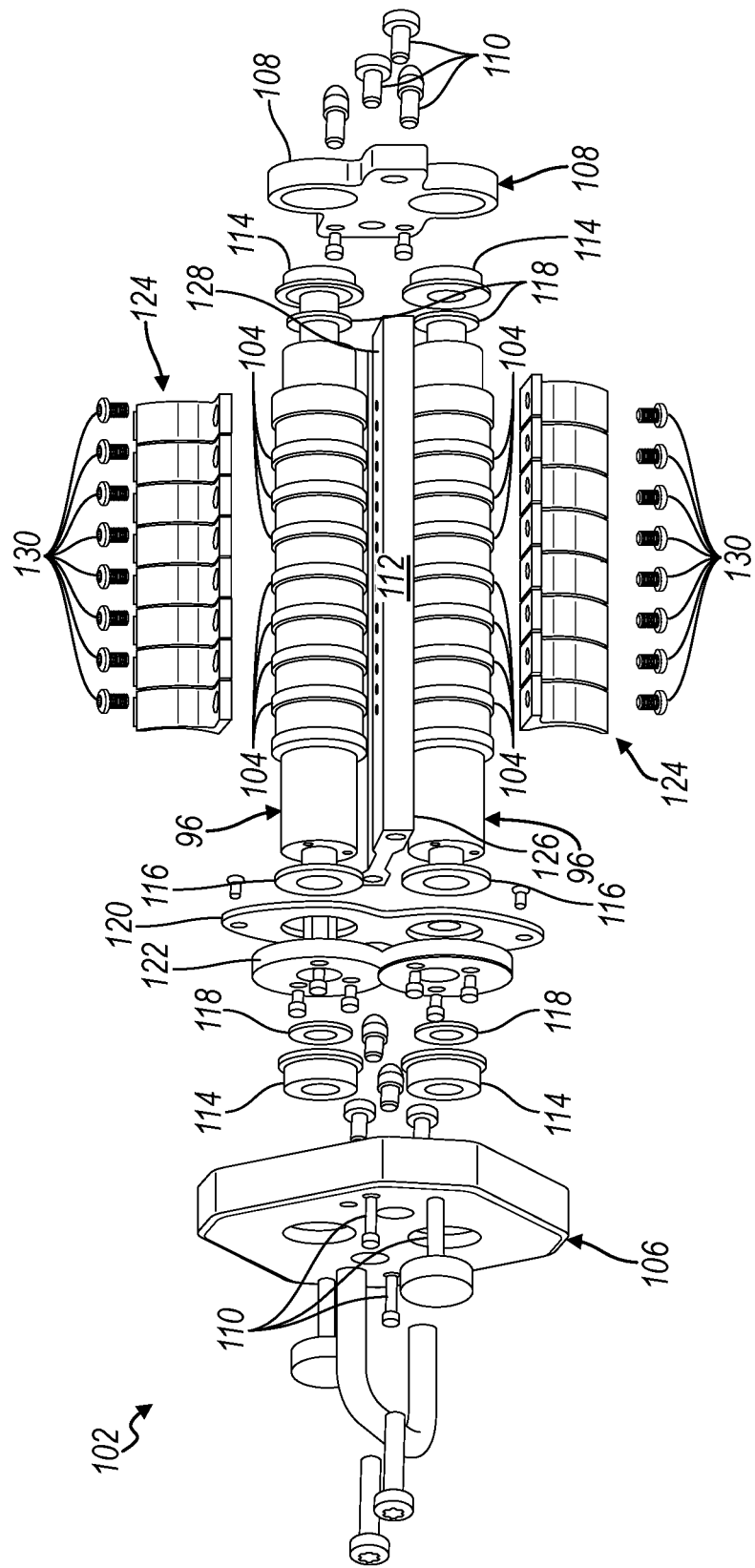
FIG. 14 is an exploded view of an implementation of a portion of a fiber placement head.
Figure 15:
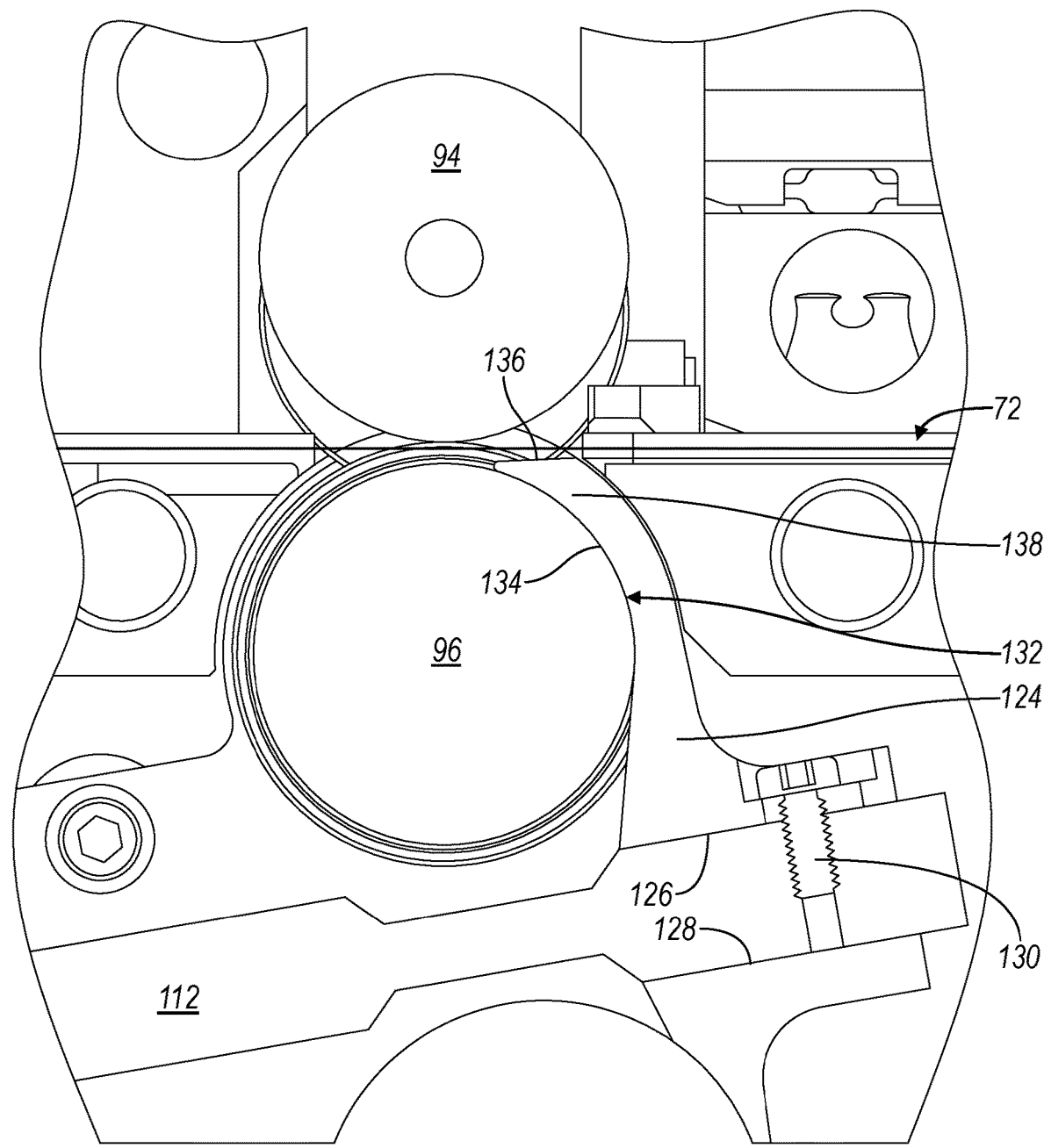
FIG. 15 is a profile view of an implementation of a portion of a fiber placement head.

A restart module 102, shown in more detail in FIGS. 14-15, can be carried by the CCR assembly 32 such that it can be removed from the CCR assembly 32 as a discrete unit. The restart module 102 can include powered wheels 96 that may be positioned on one side of the composite tape so that the powered wheels 96 oppose corresponding guide wheels 94. The powered wheels 96 can be formed from an elongated shaft that includes a plurality of raised annular portions 104 that can engage the fiber or composite tape as it passes through the fiber placement head 14. However, in other implementations, the powered wheels and/or guide wheels can be formed without the raised annular portions and be roughly cylindrically shaped. The powered wheels 96 can be axially constrained between a base plate 106 and an end plate 108. One or more fasteners 110 can attach the base plate 106 and the end plate 108 to opposite ends of a center plate 112. The center plate 112 can be elongated and stretch across the width of the lane paths 72. A plurality of bearings 114, gear spacers 116, shims 118, and a gear cover plate 120 can be positioned axially between the base plate 106 and the end plate 108. A handle 71 can be affixed to the base plate 106 and can be used to slide the CCR assembly 32 away from the fiber placement head 14 in a direction perpendicular to the travel of composite tape through the lane paths 72. The powered wheels 96 can be driven by an electric motor 98 having an output shaft that is coupled with at least one of the powered wheels 96. In some embodiments, a drive gear 122 can communicate rotational motion from one powered wheel 96 to another powered wheel 96. The powered wheels 96 can be rotated by the electric motor 98 to move the composite tape or the powered wheels 96 can be held immobile for firmly holding the composite tape. It is possible for the composite tape to be held immobile against a sprag (one-way) bearing, clutched shaft, or a stationary plate.

The center plate 112 can be positioned in between a powered wheel 96 positioned above the plate 112 engaging the guide wheel 94 associated with the upper feed portion 42 and a powered wheel 96 located below the plate 112 engaging the guide wheel 94 associated with the lower feed portion 44. A plurality of elongated arms 124 or fingers that are shaped to prevent unwanted fiber wraps around one of the guide wheels 94 or power wheels 96 can be fixed to a first mounting surface 126 of the center plate 112 and extend outwardly away from the plate 112 toward one of the power wheels 96 and another plurality of elongated arms 124 or fingers that are shaped to prevent unwanted fiber wraps around one of the guide wheels 94 or power wheels 96 can be fixed to a second mounting surface 128 and extend outwardly away from the plate 112 toward another of the powered wheels 96. In some embodiments, the elongated arms 124 can be rigidly affixed to the fastening surfaces 124, 126 with fasteners 130, such as screws, pins, or a bolt/nut combination. The elongated arms 124, 126 can have an arcuate shape along a section 132 that extends away from the mounting surfaces 126, 128 of the center plate 112. In some implementations, the elongated arms 124 can be discrete elements for each lane path 72 while in other implementations the elongated arms 124 are rigidly attached to each other so they are fixed relative to each other. The contour of the arcuate shape can closely conform to an outer surface 134 of the powered wheel 96 such that the elongated arms 124 are in close proximity to or directly contact the outer surface 134. The elongated arms 124 can also include a planar surface 136 at a distal end 138. The planar surface 136 can be flush with a lane path 72 so as to fill or block a gap that may be susceptible to catching fiber tape as it travels down the lane path 72. In some embodiments, the planar surface 136 can be angled relative to a surface of the lane path 72 so that the planar surface 136 is not coplanar with the lane path 72. The angled relationship of the planar surface relative to the lane path 72 can be used to guide the direction of the fiber tape as it passes down the lane path 72 and contacts the planar surface 136. The elongated arms 124 can be cast out of any one of a number of metal alloys, water cut from metal bar stock, formed from a plastic that maintains its shape when exposed to temperatures that exist during fiber placement, or they can be created with a three-dimensional printer.

Figure 16:
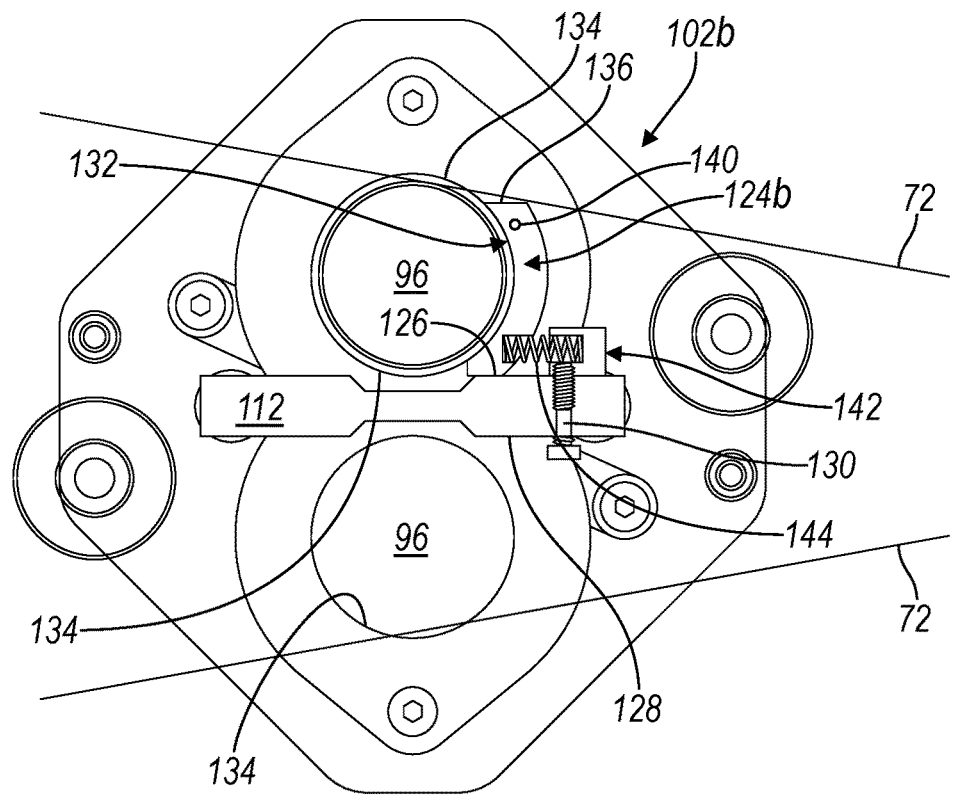
FIG. 16 is a profile view of another implementation of a portion of a fiber placement head.

Other implementations of the restart module are possible. For example, turning to FIG. 16 a restart module 102b is shown in profile view having a plurality of elongated arms 124b that are opposably biased into engagement with the powered wheels 96. The elongated arms 124b can, in some implementations, be fixed relative to each other, while in other implementations the arms 124b can be independent of each other and rotate about a pivot 140 carried by the gear cover plate 120 into engagement with the power wheels 96. In other implementations, the pivot can be omitted if the elongated arm is sufficiently rigid. Or a pivot bar may be carried but the gear cover plate in other implementations. A resistance block 142 can be affixed to the first mounting surface 126 or the second mounting surface 128 of the center plate 112 constraining a biasing element 144, such as a coil spring, in between the elongated arms 124b and the block. The biasing element can maintain the elongated arms in contact with the power wheels 96.

Figure 17:
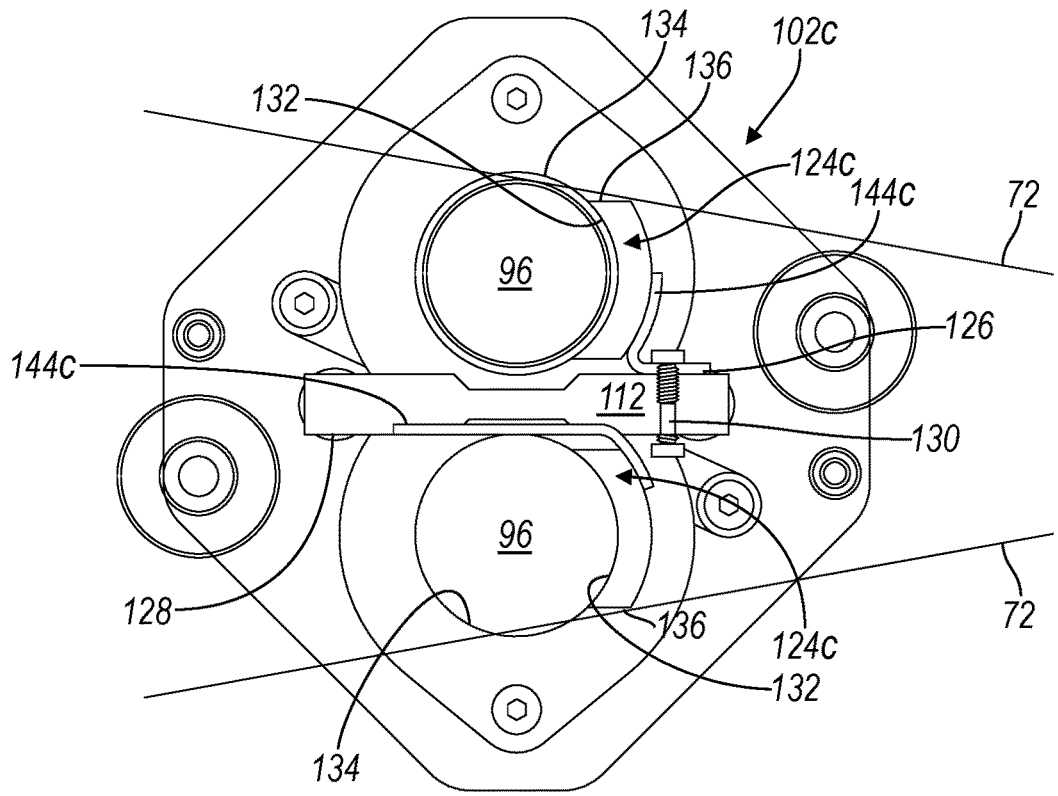
FIG. 17 is a profile view of another implementation of a portion of a fiber placement head.

Turning to FIG. 17, another implementation of the restart module 102c is shown in profile view having a plurality of elongated arms 124c that are opposably biased into engagement with the powered wheels 96. The elongated arms 124c can each move independently of each other but in other implementations can be fixed relative to each other. The elongated arms 124c may also rigidly coupled with a biasing element 144c. It is possible for each elongated arm 124c to be engaged with its own biasing element 144c or in other implementations a single biasing element 144c could move all elongated arms 124c. In this implementation, the biasing element 144c can be a leaf spring. The leaf spring biasing element 144c that urges the elongated fingers into engagement with the power wheel 96 nearest the upper feed portion 42 can push the elongated fingers 124c into engagement with the power wheel 96 from a mounting surface 126, 128 adjacent an outer surface 134 of the power wheel 96 contacting the elongated fingers 124c measured relative to an axis (a) of power wheel 96 rotation. The leaf spring biasing element 144c that urges the elongated fingers 124c into engagement with the power wheel 96 nearest the lower feed portion 44 can push or pull the elongated fingers 124c into engagement with the power wheel 96 from a support surface 126, 128 opposite an outer surface 134 of the power wheel 96 contacting the elongated fingers 124c measured relative to an axis (a) of power wheel 96 rotation. The biasing elements 144c can maintain the elongated arms 124c in contact with the power wheels 96.

Figure 18:
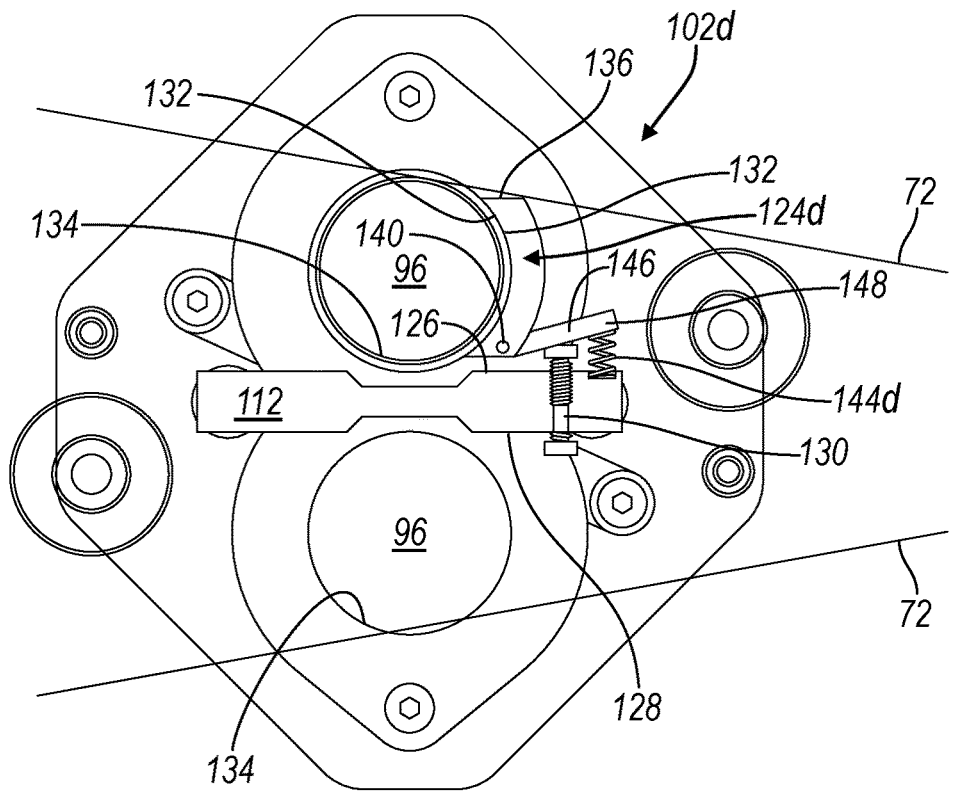
FIG. 18 is a profile view of another implementation of a portion of a fiber placement head.

Turning to FIG. 18, yet another implementation of the restart module 102d is shown in profile view having a plurality of elongated arms 124d that are opposably biased into engagement with the powered wheels 96. The elongated arms 124d can move independently of each other and rotate about a pivot 140 carried by the gear cover plate 120 into engagement with the power wheels 96. However, in other implementations, the elongated arms 124d can be fixed relative to each other. A link member 146 can be rigidly attached to the elongated arms 124d such that force exerted on a distal end 148 of the link member 146 can force the elongated arms 124d into contact with the power wheel 96. A biasing element 144d, such as a coil spring, can be constrained in between the center plate 112 and the distal end 148 of the link member 146. The biasing element 144 can maintain the elongated arms 124d in contact with the power wheels 96.

Figure 19:
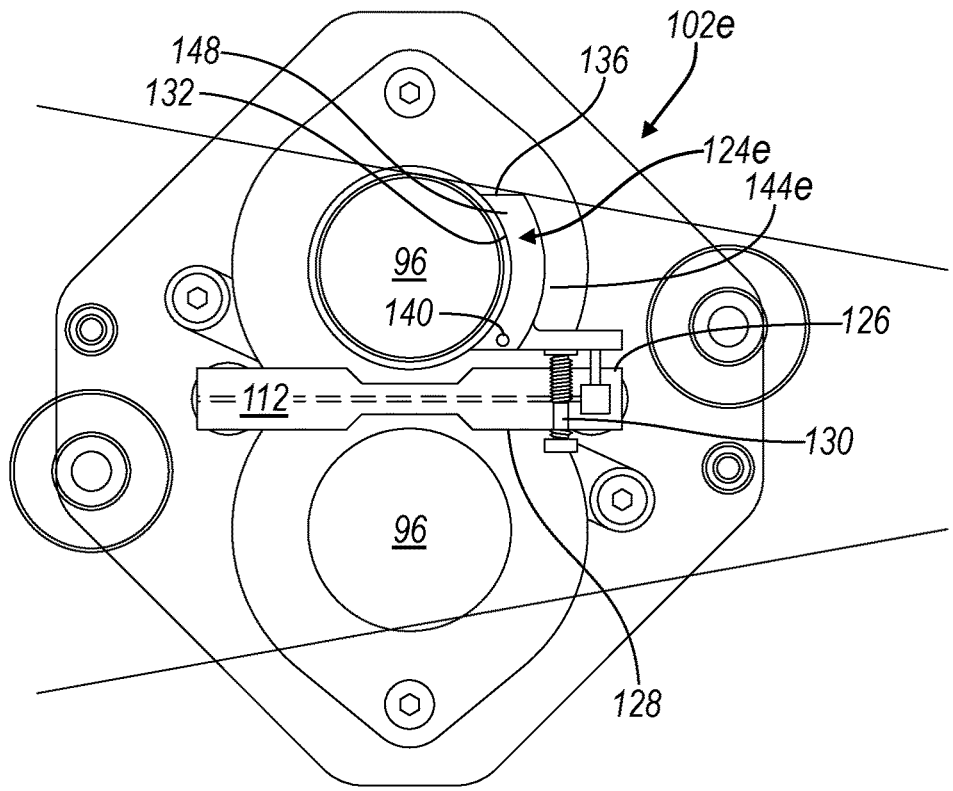
FIG. 19 is a profile view of another implementation of a portion of a fiber placement head.

Turning to FIG. 19, yet another implementation of the restart module 102e is shown in profile view having a plurality of elongated arms 124e that are opposably biased into engagement with the powered wheels 96. The elongated arms 124e can be fixed relative to each other and rotate about a pivot 140 carried by the gear cover plate 120 into engagement with the power wheels 96. However, in other implementations, the elongated arms 124e can move independently from each other. A link member 146 can be rigidly attached to the elongated arms 124e such that force exerted on a distal end 148 of the link member 146 can force the elongated arms 124e into contact with the power wheel 96. Pneumatic force, such as could be applied by compressed gas through a piston, can be communicated through the center plate 112 into contact with the distal end 148 of the link member 146. The pneumatic force can maintain the elongated arms in contact with the power wheels 96.

The guide wheel 94 contacts a side of the composite fiber tape opposite from the side contacted by the powered wheels 96 thereby squeezing the tape between the wheels. The guide wheel 94 can work in cooperation with the powered wheels 96 to either move composite tape through the lane paths 72 or hold the composite tape in place. The powered wheels 96 can be driven by the electric motor 98 while the guide wheels 94 can freely rotate and permit the composite fiber tape to move. Or the electric motor 98 can hold the powered wheels 96 still and the pneumatic piston 80 can be actuated to prevent the guide wheels 94 from rotating to hold the tape in place. The pneumatic piston 80 can move in response to the receipt of compressed air to selectively hold the guide wheel 94 immobile thereby holding the composite fiber in place. In this implementation, the fiber placement head 14 includes eight clamping lane modules 54b and eight restarting lane modules 54c—four clamp lane modules and four restart lane modules on the upper feed portion 42 and four clamping lane modules 54b and four restarting lane modules 54c on the lower feed portion 44. In this implementation, the fiber placement head 14 can include twenty-four lane modules 54 including the cutting lane modules 54a. However, other implementations with greater or fewer lane modules 54 are possible.

The robotic arm 12 can move the fiber placement head 14 relative to the mold 20 to create a composite part. The robotic arm 12, the powered wheels 96, the cutting lane modules 54a, the clamping lane modules 54b, and the restarting lane modules 54c work in concert to apply composite tape to the mold 20. The restarting lane modules 54c can move the composite fiber through the lanes 72 until it reaches the compaction roller 34. The clamping lane modules 54b can then be actuated to hold the composite fiber preventing it from moving within the lanes 72. The compaction roller 34 can then be moved into contact with the mold 20 and apply an end of the composite tape to the mold 20. The clamping lane modules 54b can release the composite fiber and the robotic arm 12 moves the fiber placement head 14 over the mold 20 and the compaction roller 34 can apply the composite tape to the mold 20. Once a defined amount of composite tape has been applied to the mold 20, the clamping lane modules 54b can be actuated to hold the composite tape from the spools 26 in place and the cutting lane modules 54a can be actuated to cut the desired length of composite tape that is applied to the mold 20. The restarting lane modules 54c can be engaged and the clamping modules 54b disengaged to permit additional composite tape to be supplied to the compaction roller 34 so that a new course of composite tape can be applied to the mold 20.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A fiber placement head for applying a plurality of composite tape segments on a mold, comprising:
   one or more powered wheels that are configured to engage and move composite tape; and
   one or more elongated fingers that conform(s) to or abut an outer surface of the powered wheel(s) such that a portion of the elongated finger(s) is adjacent to or forms at least a portion of a lane path.

2. The fiber placement head recited in claim 1, wherein the powered wheel(s) and elongated finger(s) are carried by a restart module that is removable from the fiber placement head.

3. The fiber placement head recited in claim 1, wherein the elongated finger(s) is/are placed upon a mounted surface and include an arcuate shape extending away from said mounting surface.

4. The fiber placement head recited in claim 1, wherein the elongated finger(s) include a planar surface that forms at least a portion of a lane path.

5. The fiber placement head recited in claim 1, further comprising a biasing element that biases the elongated finger(s) into engagement with the powered wheel(s).

6. The fiber placement head recited in claim 5, further comprising a resistance block coupled to a center plate and a pivot positioned on an elongated finger, wherein the biasing element is constrained between the resistance block and the elongated finger to rotate the elongated finger about the pivot into engagement with the powered wheel(s).

7. The fiber placement head recited in claim 5, wherein the biasing element is a leaf spring or a coil spring.

8. The fiber placement head recited in claim 5, further comprising a link member rigidly attached to the elongated finger(s), wherein the biasing element abuts the link member and rotates the elongated finger(s) about a pivot.

9. A fiber placement head for applying a plurality of composite tape segments on a mold, comprising:
   a plurality of powered wheels that are configured to engage and move composite tape;
   a center block, positioned in between the powered wheels, having a first mounting surface and a second mounting surface; and
   a plurality of elongated fingers that conform(s) to or abut an outer surface of the powered wheels and are attached to the center block at the first mounting surface and the second mounting surface.

10. The fiber placement head recited in claim 9, wherein the powered wheels and elongated fingers are carried by a restart module that is removable from the fiber placement head.

11. The fiber placement head recited in claim 9, wherein the elongated fingers is/are placed upon a mounted surface and include an arcuate shape extending away from said mounting surface.

12. The fiber placement head recited in claim 9, wherein the elongated fingers include a planar surface that forms at least a portion of a lane path.

13. The fiber placement head recited in claim 9, further comprising a biasing element that biases the elongated fingers into engagement with the powered wheels.

14. The fiber placement head recited in claim 13, further comprising a resistance block coupled to the center plate and a pivot positioned on an elongated finger, wherein the biasing element is constrained between the resistance block and the elongated finger to rotate the elongated finger about the pivot into engagement with the powered wheels.

15. The fiber placement head recited in claim 14, wherein the biasing element is a leaf spring or a coil spring.

16. A fiber placement head for applying a plurality of composite tape segments on a mold, comprising:
- one or more powered wheels that are configured to engage and move composite tape;
- a center block, positioned in between the powered wheels, having at least one mounting surface; and
- a plurality of elongated fingers that conform(s) to or abut an outer surface of the powered wheel(s) and are biased into engagement with an outer surface of the powered wheels.

17. The fiber placement head recited in claim 16, wherein the powered wheels and elongated finger(s) are carried by a restart module that is removable from the fiber placement head.

18. The fiber placement head recited in claim 16, wherein the elongated fingers is/are placed upon a mounted surface and include an arcuate shape extending away from said mounting surface.

19. The fiber placement head recited in claim 16, wherein the elongated fingers include a planar surface that forms at least a portion of a lane path.

20. The fiber placement head recited in claim 16, wherein the elongated fingers are biased by a leaf spring or a coil spring.

* * * * *